United States Patent [19]

de Ruyter

[11] 4,346,652

[45] Aug. 31, 1982

[54] APPARATUS FOR MAKING A MEAT ANALOG

[76] Inventor: Peter W. A. de Ruyter, 3480 Rang des Soixante, St. Jean Baptiste de Rouville, Quebec, Canada, J0L 2B0

[21] Appl. No.: 256,612

[22] Filed: Apr. 22, 1981

Related U.S. Application Data

[60] Continuation-in-part of Ser. No. 83,330, Oct. 10, 1979, abandoned, which is a division of Ser. No. 940,108, Sep. 6, 1978, abandoned, which is a division of Ser. No. 791,137, Apr. 26, 1977, Pat. No. 4,125,635.

[51] Int. Cl.³ .............................................. A23J 3/00
[52] U.S. Cl. ...................................... 99/483; 366/89; 366/323
[58] Field of Search ............... 99/348, 373, 483, 450.1, 99/467, 516; 366/77, 79, 88, 89, 321, 323, 327; 426/506–509, 516, 517, 802; 425/207, 208, 378 R; 264/202, 176 R; 100/117, 145

[56] References Cited

U.S. PATENT DOCUMENTS

| | | | |
|---|---|---|---|
| 3,728,053 | 4/1973 | Stillhard et al. | 366/77 |
| 4,099,455 | 7/1978 | Wenger et al. | 99/483 |
| 4,129,386 | 12/1978 | Rauwendall | 366/88 |

*Primary Examiner*—Philip R. Coe
*Assistant Examiner*—Timothy F. Simone
*Attorney, Agent, or Firm*—Watson, Cole, Grindle & Watson

[57] ABSTRACT

The present invention provides an apparatus for texturizing protein products; the apparatus includes a screw conveyor through which a protein dough containing a heat coagulable protein is passed with the conveyor having an internal conveying section changing in configuration such that the dough is stretched during passage through the conveyor, while being heated to a temperature above the heat coagulation temperature of the protein to provide a meat-like fiber structure wherein the fibers are aligned.

4 Claims, 6 Drawing Figures

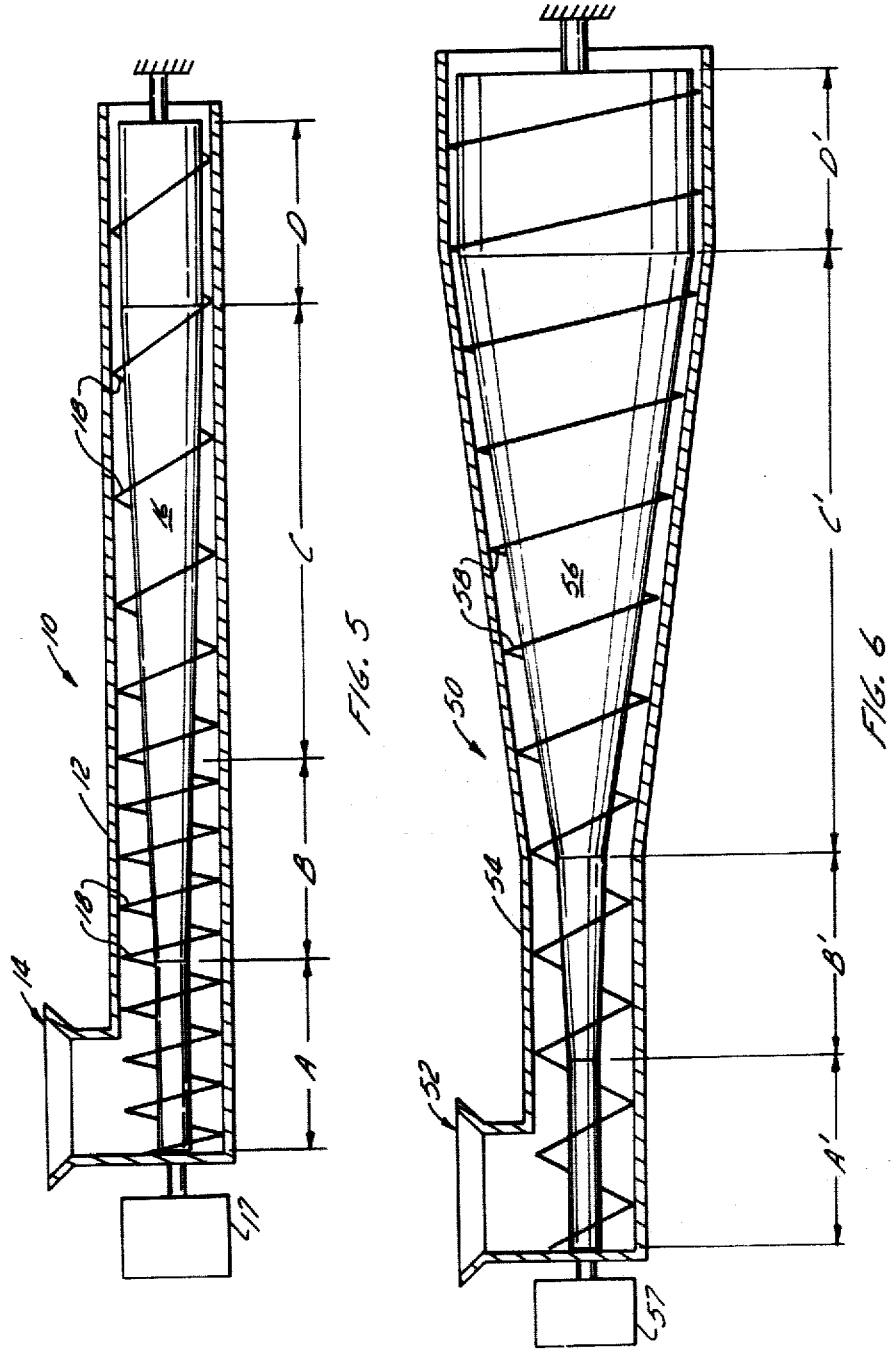

APPARATUS FOR MAKING A MEAT ANALOG

CROSS-REFERENCE TO RELATED APPLICATIONS

The present application is a continuation-in-part application of application Ser. No. 83,330, filed Oct. 10, 1979, now abandoned, which was a divisional application of application Ser. No. 940,108, filed Sept. 6, 1978, now abandoned, which was a divisional application of application Ser. No. 791,137, filed Apr. 26, 1977, now U.S. Pat. No. 4,125,635.

BACKGROUND OF THE INVENTION

The present invention relates to an apparatus useful for texturizing proteins. Meat analog products are well known in the art as are various methods of preparing such meat analog products. Generally, the meat analog products have found some use as substitutes for natural meat products as they often contain less calories and a higher protein content. However, public acceptance and use of the products has still been limited due to the visual appearance of such products. Although developments in the art have enabled one to manufacture meat analog products having superior properties as far as nutrition and cost is concerned, the products still do not possess the desired meat-like or fibrous appearance and texture.

Several different techniques are, as aforementioned, known for making meat analog products. Thus, there is the well known fiber spinning or thermoplastic extrusion technique which is illustrated in U.S. Pat. Nos. 2,682,466; 2,730,447 and 2,730,448. According to this technique, a spinning dope is formed from alkali-treated protein such as soy protein, and the dope is extruded through a dye or membrane into an aqueous precipitating bath which contains an acid and a salt. The acid bath sets the filaments or fibers following which the filaments may be bundled together and stretched to orient the molecular structure of the fibers. Further patents relating to this technique are U.S. Pat. Nos. 3,498,793 and 3,559,561.

A further well known technique for forming meat analog products is illustrated in, among others, U.S. Pat. Nos. 3,488,031; 3,488,770; 3,480,442 and 3,496,858. This technique is basically an adaptation of technology involved in making ready-to-eat cereal food products; a mixture of protein, water anf flavour is prepared whereafter the mixture is fed into a cooker-extruder where it is subjected to heat and pressure and subsequently extruded. Following the extrusion into the atmosphere, the product expands to form a product which has fiber-like material therein.

Recently, there have been further techniques developed for the formation of meat analog products. One such technique is described in U.S. Pat. Nos. 3,814,823 and 3,693,533. These patents describe a process and apparatus for forming a meat-like product wherein a protein mix containing a heat-coagulable protein is formed, the moisture content of the protein mix being adjusted, following which the wet mix is worked to provide a coherent workable protein-containing dough. The dough is then subjected to a non-turbulent stretching and heat to provide unidirectional parallel meat-like fibers. An apparatus adapted to carry out the method is illustrated in U.S. Pat. No. 3,693,533, which apparatus is a pair of endless belts forming a convergent space therebetween in a first plane and a divergent space in a second plane such that the protein dough fed thereto is decreased in a first dimension and increased in a second dimension to form a slab of meat analog product.

U.S. Pat. No. 3,886,298 teaches a technique of forming meat analog products wherein a wet protein dough is fed to an extruder wherein it is compressed and heated. The dough, when extruded, is subjected to a pressure drop causing expansion of the dough.

A similar process is taught in U.S. Pat. No. 3,886,299 except that the pressure drop upon extrusion is low to minimize the puffing of the product.

It is an object of the present invention to provide an apparatus for texturizing protein, which apparatus produces a meat analog product having the texture and appearance of meat, and wherein the fibers in the product are aligned in a curvi-linear manner.

SUMMARY OF THE INVENTION

According to one aspect of the present invention, an improved apparatus for texturizing protein products includes a screw conveyor for taking a heat coagulable protein and moving it from one end of the conveyor to the other end. In the screw conveyor, the heat coagulable protein is subjected to a stretching action. The conveyor is configured such that the cross-sectional area between the screw root and the barrel of the conveyor remains substantially constant, although with a changing configuration.

In one particular aspect of the present invention, the apparatus, includes a screw conveyor having a barrel of a constant internal diameter and a rotatable screw therein, the screw having a screw root of increasing diameter with helical flights thereon, the helical flights having an increasing helix angle such that the conveyor capacity between adjacent helical flights is constant, an inlet to the screw conveyor at the end thereof having the smaller screw root diameter and an outlet at the end of the conveyor having the larger screw root diameter, means for supplying a wet protein dough containing a heat coagulable protein to the said inlet, means for rotating the rotatable screw, and means for heating at least a portion of the conveyor.

In a yet further aspect of the present invention, the apparatus includes a screw conveyor having a barrel of an increasing internal diameter with a rotatable screw therein, the screw having a screw root of increasing diameter, the screw root diameter increasing at a rate greater than the increase in the internal diameter of the barrel, and helical flights on the screw root, the helical flights being of a decreasing helix angle, the rate of increase of the internal diameter of the barrel, the rate of increase of the diameter of the screw root, and the decreasing helix angle being such that the conveying capacity of the screw conveyor in each 360° turn of the screw is constant, an inlet at the narrower end of the screw conveyor, an outlet at the wider end of the screw conveyor, means for supplying and feeding a wet protein dough containing a heat-coagulable protein to the inlet, means for rotating the rotatable screw, and means for heating at least a portion of the conveyor.

The protein dough used in the present invention may be formed according to techniques known in the prior art. Thus, an initial dry protein mix may be formed, which protein mix may comprise up to 100% by weight of a heat-coagulable protein. Preferably, at least 30% by weight of the protein mix is heat-coagulable protein. As taught in the prior art, other ingredients which may be added to the dry protein mix include fats; carbohydrates such as starch; emulsifiers such as lecithin; proteolytic enzymes such as marketed under the trade marks "PANOL", "ENZECO" or "BROMELAIN"; amino-acids for increasing the nutritional value such as lysine, methionine, etc., or those such as cysteine which improve the propensity of the dough to form fibers; flavoring; coloring; vitamins; etc.

The source of the protein may be any one of many well recognized heat-coagulable edible proteins. Thus, vegetable and/or animal protein may be utilized. Suitable vegetable protein sources include soy beans, safflower seed, corn, peanuts, wheat, peas, sunflower seeds, cotton seed, coconut, rape seed, sesame seed, leaf proteins, single cell proteins such as yeast, and the like. As taught in U.S. Pat. No. 3,814,823, a vegetable protein is placed in a relatively pure form by well known techniques. Animal protein sources may be employed in a mixture with the vegetable proteins.

According to the present invention, dairy and fish proteins may also be employed. Thus, concentrated purified whey proteins with a minimum of lactose are suitable for use in the present invention; such proteins have been found to be very suitable for use according to the method of the present invention. Thus, for example, concentrated whey proteins such as are marketed under the trade mark "ENR PRO-75" may be used as a portion of the edible protein. Another useful animal protein is egg-albumen. In some cases it is advantageous to add gelatin. Particularly preferred protein sources are refined soy proteins, wheat proteins such as contained in commercial wheat gluten and wheat flour, egg albumen and whey protein concentrates.

The dry protein mix is usually moisture-adjusted to form a wet mix such that the wet dough formed may be stretched or elongated to form fibers. Generally, a moisture content of between 20% and 80% of the wet mix is desirable depending on the specific protein mix. More preferably, a moisture content within the range of between 30% to 60% of the wet mix is employed. In addition to water, liquids such as alcohol, glycerol, propylene glycol, and other acceptable liquids may be employed.

The wet mix is prepared at a temperature less than the heat coagulation temperature of the heat coagulable protein to provide a protein dough for processing. The mixing is dependent on the protein and composition of the mix and the type of mixing will also depend on the composition of the protein mix. Thus, in many cases, a single mixing step with, for example, a Hobart mixer is sufficient while for other compositions, a multiple mixing procedure using initially a Hobart mixer followed by a mixing with a double arm Sigma mixer has been found to provide a more uniform dough. If desired, and as is sometimes advantageous, the mixing may be done in a portion of the screw conveyor as will be discussed in greater detail hereinafter.

The protein dough is then subjected to a curvi-linear stretching step which forms the fibers in the final product. This curvi-linear stretching of the dough is an essential feature wherein the dough is passed through a screw conveyor which subjects the dough to the stretching by one of two means.

In a first embodiment, the conveyor has a barrel with inlet and outlet ends, and a rotatable screw therein. The rotatable screw has a screw root of increasing diameter such that the depth between the screw root and internal wall of the barrel is continuously decreasing thereby giving a decreasing capacity per unit length of the conveyor. However, helical flights which are provided on the screw root have an increasing helix angle from the inlet end to the outlet end of the barrel. Thus, the total volume between "adjacent" helical flights is constant, or in other words, there is a constant volume of conveying capacity through each 360° turn of the screw. The dough fed to the inlet of the conveyor is thus stretched in a direction approximately normal to the direction of the channel between adjacent helical flights and thus approximately normal to the helical flights. Thus, each fiber is oriented and aligned in a curvi-linear manner. Desirably, the product is not subjected to a pressure drop at the outlet end of the conveyor whereby the final product will have a fiber structure and appearance very similar to natural meat products.

A second embodiment of the above comprises a conveyor having a barrel with an inlet end and an outlet end, the barrel having an increasing internal diameter from its inlet end to its outlet end, and a rotatable screw therein. The rotatable screw has a screw root which is also of an increasing external diameter from the inlet end to the outlet end of the conveyor. The screw root tapers outwardly or has a diameter increase greater than the diameter increase of the barrel such that the internal surface of the barrel and the external surface of the screw root are converging in the direction of the outlet end. The pitch of the conveyor remains constant as does the cross sectional area of the conveying capacity; the helical flights have a decreasing helix angle. The effect of the above is to provide a conveyor which again has a constant volume capacity between adjacent helical flights. Accordingly, the protein dough fed to the conveyor is subjected to stretching of the material to again form curvi-linear aligned fibers in the final products.

During processing of the protein dough through the conveyor, heat is applied to the dough. The dough is thus heated to a temperature above the heat coagulation temperature of the particular protein or proteins in the mix which are generally above 140° F. The generally preferred temperatures to heat-set the fibrous structure lie within the range of from 170° F. to 300° F. The heat may be supplied from any suitable source and thus, the heat may be applied to the walls of the barrel alone and/or in conjunction with heat supplied to the screw root and/or helical flights. Any suitable means of supplying heat may be utilized.

The heat analog product has an oriented structure wherein the fibers are aligned. The alignment of the fibers will vary depending upon the configuration of the conveyor and they may generally be characterized by a family of approximately symmetric three-dimensional curves. For ease of reference, the fibers are referred to as being curvi-linear oriented or, in the case of the conical conveyor, approximately circularly aligned.

The conveyors, in both instances discussed above, are referred to as having a constant volume capacity between adjacent helical flights. It will be understood that a minor increase or decrease in conveying capacity may be utilized depending upon the product being formed and the composition of the mix. For example, the conveyor may be designed to allow for any thermal expansion which occurs and in addition, for any loss in volume of the product as it is conveyed due to moisture loss. However, generally the conveyor would have a maximum 10% deviation in conveying capacity from the inlet to the outlet.

The screw conveyors may also be constructed to include other components and/or sections. Thus, there may be provided an initial feed and mixing section; this feed section would be adapted to receive the raw materials from sources of the same and mix the materials to form the protein dough. If desired, special impellers may be provided on the screw root for the purpose of mixing.

The conveyor may also include a section prior to the stretching of the protein dough for compacting. In order to achieve maximum effect from the stretching section of the screw conveyor, the dough ideally is free of voids. Naturally, if so desired, means may be provided other than the screw conveyor for feeding the compacted dough directly to the stretching section.

At the exit end of the screw conveyor, there may be provided a discharge section wherein the screw has a constant pitch and the internal diameter of the conveyor is also constant.

The operating parameters and construction of the conveyor will depend, to a large degree, on the protein dough and other parameters well known to those skilled in the art. Thus, the typical dimensions may vary depending on the material being fed, the degree of stretching desired, the speed of the apparatus, etc. However, in general, the dough is stretched from between 50% to 300%. The stretching section of the conveyor would generally have a length between 5 to 40 times the internal diameter at the feed end of the barrel with a helix angle on the screw of between 5° to 450°. In an embodiment wherein a mixing section is included, the length may generally be in the area of between 3 to 40 times the internal diameter of the barrel while the section adapted to compact the dough may range up to 20 times the internal diameter of the barrel. A typical discharge section would have a length of 3 to 40 times the barrel internal diameter.

Thus, as in the embodiment wherein the screw root and barrel diameter both increase, it will be seen that the cross sectional area of the conveyor representing the conveying capacity (between the screw root and internal barrel surface) remains substantially constant but of a changing configuration. This thus subjects the protein dough to a stretching action while not permitting an expansion or compaction of the dough.

Having thus generally described the invention, reference will be made to the accompanying drawings illustrating embodiments thereof.

DESCRIPTION OF THE DRAWINGS

FIG. 5 is a side sectional view of a still further embodiment of a screw conveyor of the general type illustrated in FIG. 1; and FIG. 6 is a side sectional view of a screw conveyor including various sections of the type illustrated in FIG. 4.

DETAILED DESCRIPTION OF THE PREFERRED EMBODIMENTS

Figure 1:
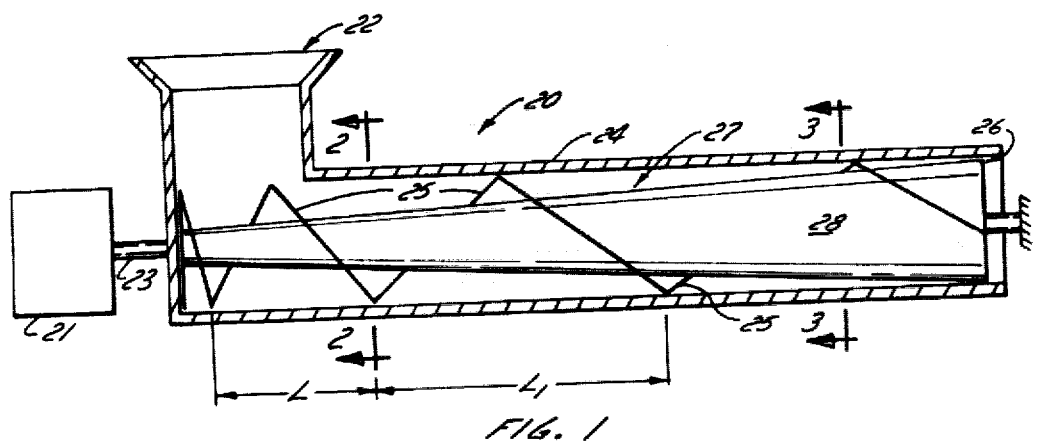
FIG. 1 is a side sectional view of a first embodiment of a screw conveyor adapted for use in the present invention.
Figure 2:
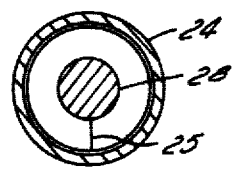
FIG. 2 is a cross-sectional view along the line 2—2 of FIG. 1.
Figure 3:
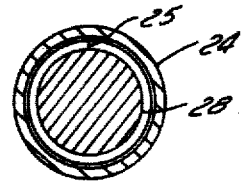
FIG. 3 is a cross-sectional view along the line 3—3 of FIG. 1.

Referring to the drawings in greater detail, and in particular to the embodiment of FIGS. 1 to 3, there is provided a conveyor generally designated by reference numeral 20, and which conveyor includes an inlet hopper 22 communicating with an internal cavity defined by a cylindrical barrel 24.

Barrel 24 is of a constant internal diameter extending from inlet hopper 22 to an outlet 26. Mounted within barrel 24 is a screw generally designated by reference numeral 27. Screw 27 comprises a screw root 28 having helical flights 25 thereon and is rotatably driven through shaft 23 by a suitable drive means 21.

As will be seen from the drawings, screw root 28 increases in diameter and thus cross-sectional area from inlet 22 to outlet 26. In other words, the distance between root 28 and barrel 24 is decreasing in the direction of conveying of the screw 27. However, helical flights 25 are arranged such that the conveying capacity of the conveyor through each 360° turn of screw 27 is constant. This is achieved by an increase in the helix angle of the flights going from the inlet 22 to outlet 26—the increase in helix angle corresponds to an increase in the pitch of the screw 27. Thus, as will be seen from FIGS. 2 and 3, the cross-sectional area between screw root 28 and barrel 24 is substantially larger proximate the inlet 22 than near the outlet 26. The volume between adjacent flights is, however, constant due to the greater pitch of the screw, i.e., $L_1 > L$.

Figure 4:
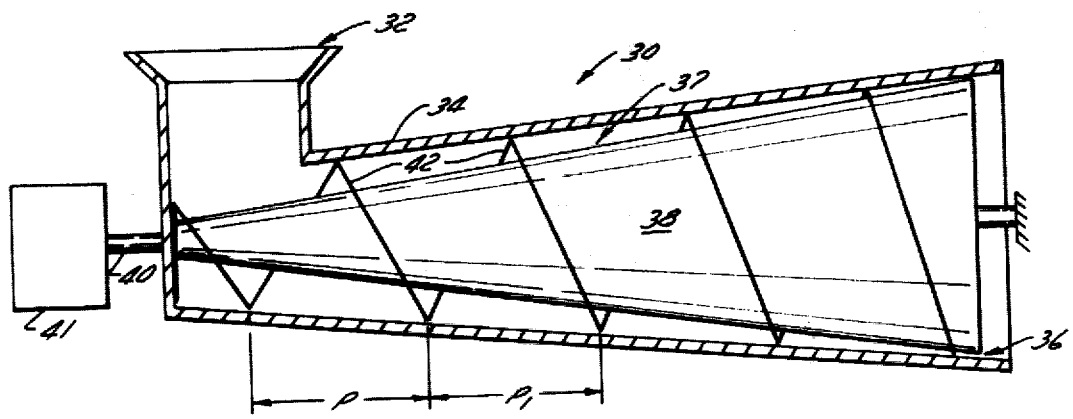
FIG. 4 is a side sectional view of a further embodiment of a screw conveyor adapted to carry out the process of the present invention.

In FIG. 4, an alternative embodiment of the present invention is illustrated. There is provided a screw conveyor generally designated by reference numeral 30, which conveyor includes a barrel 34 having at a first end an inlet 32 and at an opposed end, an outlet 36. Barrel 34 has a conical configuration—i.e. the interior of the barrel tapers outwardly from the inlet 32 to the outlet 36. Mounted within barrel 34 is a screw generally designated by reference numeral 37 comprising a screw root 38 having helical flights 42 thereon. Screw 37 is driven through shaft 40 by a suitable drive means 41.

As aforementioned, in the embodiment of FIG. 4, body or barrel 34 has an internal diameter which is increasing from inlet 32 to outlet 36. Screw root 38 is also of a conical configuration and has an increasing diameter from the inlet to the outlet; the rate of increase in diameter of screw root 38 per unit length is greater than the rate of increase in diameter per unit length of barrel 34 such that, as was the case in the previous embodiment, the distance between barrel 34 and screw root 38 is decreasing from inlet 32 to outlet 36. However, the helical flights 42 are such that the capacity or volume enclosed between adjacent helical flights is substantially constant. In this embodiment, the pitch of the screw 37 is preferably kept constant ($P = P_1$) which corresponds to a decrease in the helix angle of flights 42. Thus, in this embodiment, the barrel of the conveyor has an increasing internal diameter, the screw also has an increasing diameter, the rate of increase in the diameter of the screw root being greater than the rate of increase in the internal diameter of the barrel. The helical flights have decreasing helix angles since the pitch remains constant and the conveying capacity or the cross sectional area between the screw root and internal barrel surface also remains constant.

In operation, the protein dough is fed to the inlet of either of the above embodiments wherein it is conveyed by the screw to the outlet. During its transport, the dough is subjected to a curvi-linear stretching operation due to the change in the configuration of the screw conveyor. In these embodiments, as in subsequent embodiments, means are provided for heating the dough to a temperature above its heat-coagulation temperature. Conveniently, this may be done by suitable means associated with the screw conveyor and be such that the dough is being stretched while being heated. However, the stretching operation may occur initially followed by a heating step.

Referring to FIG. 5, there is illustrated an apparatus for texturizing protein products, the apparatus being generally designated by reference numeral 10. Apparatus 10 is basically a screw conveyor having an inlet hopper 14 communicating with an internal cavity defined by cylindrical barrel 12.

Barrel 12 is of a constant internal diameter and has mounted therein a screw comprised of a screw root 16 having helical flights 18 thereon. Screw root 16 is suitably journalled and rotatably driven by any suitable drive means.

The screw conveyor of FIG. 5 includes four different sections or zones generally designated by reference characters A, B, C and D. Zone A, located proximate inlet 14, comprises a feed and mixing section. In this section, screw root 16 is of a constant diameter with helical flights 18 having a constant pitch and helix angle—i.e. this section comprises a "normal" screw.

Zone B may be designated a "compaction" section wherein screw root 16 is of an increasing diameter with helical flights 18 having a constant pitch. In other words, the conveying capacity between adjacent helical flights in compaction zone B is continually decreasing in the direction of conveying.

Zone C of conveyor 10 is the "stretching" zone wherein the diameter of screw root 16 increases steplessly with a corresponding increase in the pitch of the screw such that the conveying capacity between two adjacent helical flights remains substantially constant. Or, in other words, the conveying capacity of the conveyor through each 360° turn of the screw is constant throughout stretching zone C. Thus, as may be seen, although the gap between screw root 16 and barrel 12 is continuously decreasing, the increasing pitch and helix angle provides for a "longer" distance between adjacent helical flights whereby the volume remains constant.

Zone D may conveniently be termed a discharge section wherein the diameter of screw root 16 remains constant as does the pitch and helix angle of flights 18.

In operation, the materials forming the protein dough as described above are fed to hopper 14 and zone A of apparatus 10. In zone A, the ingredients are mixed to form a protein dough. In this respect, the feed and mixing section may include further means for mixing the ingredients; the type of mixing and the possibility of using a pre-mix will be dependent upon the composition of the protein mix. Thus, impellers or the like may be included on the helical flights to achieve the desired mixing. The mixing may be conducted at an elevated temperature, if so desired, provided that the temperature is not above the heat-coagulation temperature of the protein in the mix. Any suitable means may be employed for heating.

In zone B, the protein dough is compacted to ensure that the dough is substantially free of voids.

In zone C, the dough is stretched while being heated to a temperature above the heat coagulation temperature of the protein to form fibers in the dough. Thus, although the conveying capacity of the screw through any 360° turn in zone C is constant, the dough is stretched due to the decrease in the gap between screw root 16 and barrel 12 with a simultaneous increase in pitch—the dough is thus forced to stretch in a curvi-linear manner which approaches transverse stretching. Zone C is heated by suitable means; conventional means such as the passing of hot fluid through the wall of barrel 12 and/or that of screw root 16 and/or flights 18 may be employed. Alternatively, in some instances, other means of heating such as micro-wave energy or the like may be employed.

Zone D, as aforementioned, is a discharge section and no further stretching of the dough occurs therein.

Turning to the embodiment of FIG. 6, there is illustrated a further embodiment of an apparatus according to the present invention, which apparatus is designated by reference numeral 50.

Apparatus 50 comprises a screw conveyor having an inlet hopper 52 at one end thereof. Screw conveyor 50 further includes a barrel 54 with a screw comprised of screw root 56 with helical flights 58 thereon journalled within barrel 54. Screw root 56 is driven by any suitable means.

As in the previous embodiment, screw conveyors 50 may conveniently be shown as having four sections or zones A', B', C' and D'.

In zone A', which is a feed and mixing zone, barrel 54 has a constant internal diameter; screw root 56 is also of a constant diameter and helical flights 58 have a constant helix angle—i.e. the pitch of the screw is constant.

In zone B', which is adapted for compaction, barrel 54 remains of a constant internal diameter while screw root 56 is of an increasing diameter. The helix angle of flights 58 remains constant with the angle of zone A'. As a result, the conveying capacity of the conveyor through any 360° turn in zone D' is reducing.

Zone C' is the stretching section wherein barrel 54 tapers outwardly in the form of a cone or pseudo-cone. In other words, the internal diameter of barrel 54 is constantly increasing. Simultaneously, screw root 56 is also tapering outwardly or is of an increasing diameter at a rate greater than the rate of taper of barrel 54 such that the "gap" between screw root 56 and barrels 4 is constantly decreasing. However, the capacity or volume through any 360° turn of the screw is substantially constant. Normally, the pitch remains substantially constant as does the cross sectional area through this section and the helix angle decreases.

Zone D' is a discharge section similar to the previously described embodiment.

In the operation of the apparatus of FIG. 6, the ingredients of the dough are again fed through inlet hopper 52 where they are mixed in Zone A'. In Zone B', the dough is compacted to ensure that there are no voids present therein.

The dough is then stretched while being heated to a temperature above the heat-coagulation temperature of the protein in the dough in zone C'. Although the volume remains substantially constant through any 360° turn of the screw, the configuration changes such that the dough is stretched to form fibers. The dough is then discharged through section D'.

It will be understood that the above-described embodiments are for purposes of illustration only and that changes and modifications may be made thereto without departing from the spirit and scope of the invention.

Thus, for example, the illustrated embodiments show the use of a mixing section, a compaction section, and a discharge section. Although these may conveniently be used, a pre-mixed compacted dough may be fed directly to the stretching section from which the dough would exit directly, as in FIGS. 1-4. Furthermore, many conventional drive means may be associated with the screw conveyor as well as means for feeding a pre-mixed dough thereto. As discussed above, the volume between adjacent flights in the stretching section is substantially constant although allowance may be made for any moisture loss and/or thermal expansion of the dough. Still further, it will be understood that many equivalents may be employed. For example, in the compaction section, in lieu of an increasing screw root diameter, the compaction may be achieved by a decreasing pitch of the screw. Furthermore, the tapering of the screw need not be uniform throughout the expansion, but rather variations may occur provided that the volume between adjacent flights is substantially constant.

I claim:

1. In an apparatus for texturizing protein products, which apparatus includes:
    a screw conveyor for simultaneously treating protein and moving it from one end of the conveyor to another end of the conveyor, the screw conveyor including an elongated barrel and an elongated rotatable screw means therein, the screw means comprising a screw root having helical flights therearound;
    means forming a protein inlet at said one end of said screw conveyor;
    means forming a protein outlet at said other end of said screw conveyor;
    means for rotating said elongated rotatable screw; and
    means for heating at least a portion of said screw conveyor;
    the improvement wherein said screw conveyor includes a protein stretching portion, the elongated barrel in said stretching portion having an increasing internal diameter, the screw of said screw means in said stretching portion also having an increasing diameter, the rate of increase in the diameter of the screw root being greater than the rate of increase in the internal diameter of the barrel, the helical flights of said screw in said stretching portion having decreasing helix angles therebetween, the pitch of the screw in the stretching section remaining substantially constant, the cross sectional area between the screw root and the barrel remaining substantially constant, such that the conveying capacity of said screw conveyor in said stretching portion remains substantially constant for each 360° turn of the screw therein and such that a protein product passing therethrough will be stretched in a curvi-linear manner.

2. The apparatus of claim 1 wherein said screw conveyor includes a compaction portion between said protein inlet means attached thereto and said stretching portion, the elongated barrel in said compaction portion having a constant internal diameter, the screw root of said screw means in said compaction portion having an increasing diameter, and the helical flights of said screw means in said compaction portion having constant helix angles therebetween.

3. The apparatus of claim 1 wherein said screw conveyor includes a mixing and feeding portion between said protein inlet means attached thereto and said compaction portion, the elongated barrel in said mixing and feeding portion having a constant internal diameter, the screw root of said screw means in said mixing and feeding portion having a constant diameter, and the helical flights of said screw means in said mixing and feeding section having constant helix angles therebetween.

4. The apparatus of claim 3 wherein the stretching portion of said screw conveyor has a length of between 5 and 40 times the internal diameter of the barrel in the mixing and feeding portion thereof.

* * * * *